(12) United States Patent
Liu et al.

(10) Patent No.: US 10,079,963 B1
(45) Date of Patent: Sep. 18, 2018

(54) DISPLAY METHOD AND DISPLAY SYSTEM FOR VIDEO WALL

(71) Applicant: VIA Technologies, Inc., New Taipei (TW)

(72) Inventors: Steve Shu Liu, New Taipei (TW); Chong Liu, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 15/593,341

(22) Filed: May 12, 2017

(30) Foreign Application Priority Data

Apr. 14, 2017 (CN) .......................... 2017 1 0243834

(51) Int. Cl.
| | | |
|---|---|---|
| *H04N 5/04* | (2006.01) | |
| *H04L 29/06* | (2006.01) | |
| *G06F 3/14* | (2006.01) | |
| *H04N 5/44* | (2011.01) | |

(52) U.S. Cl.
CPC ............. *H04N 5/04* (2013.01); *G06F 3/1431* (2013.01); *G06F 3/1446* (2013.01); *H04L 65/4076* (2013.01); *H04L 65/607* (2013.01); *H04N 5/44* (2013.01)

(58) Field of Classification Search
CPC ................................................ G09G 2300/026
USPC .......................................................... 348/383
See application file for complete search history.

(56) References Cited

U.S. PATENT DOCUMENTS 6,501,441 B1 * 12/2002 Ludtke .................. G06F 3/1446
345/1.1
9,179,103 B2 * 11/2015 Wengrovitz ............ H04N 7/181

2012/0075465 A1 * 3/2012 Wengrovitz ........... H04N 7/181
348/143
2015/0215497 A1 * 7/2015 Zhang ................ H04N 21/4307
348/521
2015/0304526 A1 * 10/2015 Maurice ............. H04N 21/4307
348/513
2015/0341570 A1 * 11/2015 Jaynes ................ G06F 3/04817
348/705

(Continued)

FOREIGN PATENT DOCUMENTS

| CN | 101436396 | 5/2009 |
|---|---|---|
| CN | 102902502 | 6/2015 |
| TW | 201026020 | 7/2010 |

OTHER PUBLICATIONS

"Office Action of Taiwan Counterpart Application," dated Oct. 5, 2017, p. 1-p. 9.

*Primary Examiner* — Paulos M Natnael
(74) *Attorney, Agent, or Firm* — JCIPRNET

(57) ABSTRACT

A display method and a display system for a video wall are proposed. The method is applicable to a display system having a server and multiple player devices. Each of the player devices is connected to the server and a video wall having multiple displays, and each of the player devices corresponds to a different one of the displays and a different one of regions in a video stream. The method includes to receive the video stream from the server by each of the player devices, to send a broadcast command by a master player device among the player devices to other player devices, and to start displaying the corresponding region in a first frame of the video stream on the corresponding display of the video wall by each of the player devices after a preset delay time interval according to the broadcast command.

14 Claims, 2 Drawing Sheets

(56) References Cited

U.S. PATENT DOCUMENTS

2016/0337706 A1* 11/2016 Hwang ............ H04N 21/23614
2016/0357493 A1* 12/2016 Zerwas ................ G06F 3/1438

* cited by examiner

_US 10,079,963 B1_

DISPLAY METHOD AND DISPLAY SYSTEM FOR VIDEO WALL

CROSS-REFERENCE TO RELATED APPLICATION

This application claims the priority benefit of China application serial no. 201710243834.9, filed on Apr. 14, 2017. The entirety of the above-mentioned patent application is hereby incorporated by reference herein and made a part of this specification.

TECHNICAL FIELD

The disclosure relates to a display method and a display system, in particular to, a display method and a display system for a video wall.

BACKGROUND

A video wall is a special multi-display setup that consists of multiple screens tiled together continuously in order to form one large screen for digital information and is commonly used in a control room, a video conference, or an indoor or outdoor billboard. The existing video walls are mostly implemented based on a FPGA or an X86 infrastructure.

The FPGA infrastructure is a purely hardware implementation that costs more and limits the third party application. The X86 infrastructure is able to connect all displays on a video wall through signal transmission lines that support high-definition multimedia interface (HDMI) or digital visual interface (DVI) or through multiple graphic cards. However, the size of the video wall under such infrastructure is restricted by the lengths of the signal transmission lines and memory spaces. Moreover, to control the synchronization among the displays for creating smooth and stable stitched frames is also a problem to be solved.

SUMMARY OF THE DISCLOSURE

Accordingly, a display method and a display system for a video wall are proposed in the disclosure, in which not only provides improved application flexibility, but also ensures synchronization among frames displayed by each display on a video wall for better display quality.

According to one of the exemplary embodiments, the display method for the video wall is applicable to a display system having a server and multiple player devices. Each of the player devices is connected to the server and a video wall having multiple displays, and each of the player devices corresponds to a different one of the displays and a different one of regions in a video stream. The method includes to receive the video stream from the server by each of the player devices, to send a broadcast command by a master player device to other player devices, and to start displaying the corresponding region in a first frame of the video stream on the corresponding display of the video wall by each of the player devices after a preset delay time interval according to the broadcast command.

According to one of the exemplary embodiments, the display system for the video wall includes a server and multiple player devices. Each of the player devices is connected to the server and a video wall having multiple displays, and each of the player devices corresponds to a different one of the displays and a different one of regions in a video stream. Each of the player devices receives the video stream from the server. A master device sends a broadcast command to other player devices. Each of the player devices starts displaying the corresponding region in a first frame of the video stream on the corresponding display of the video wall after a preset delay time interval according to the broadcast command.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
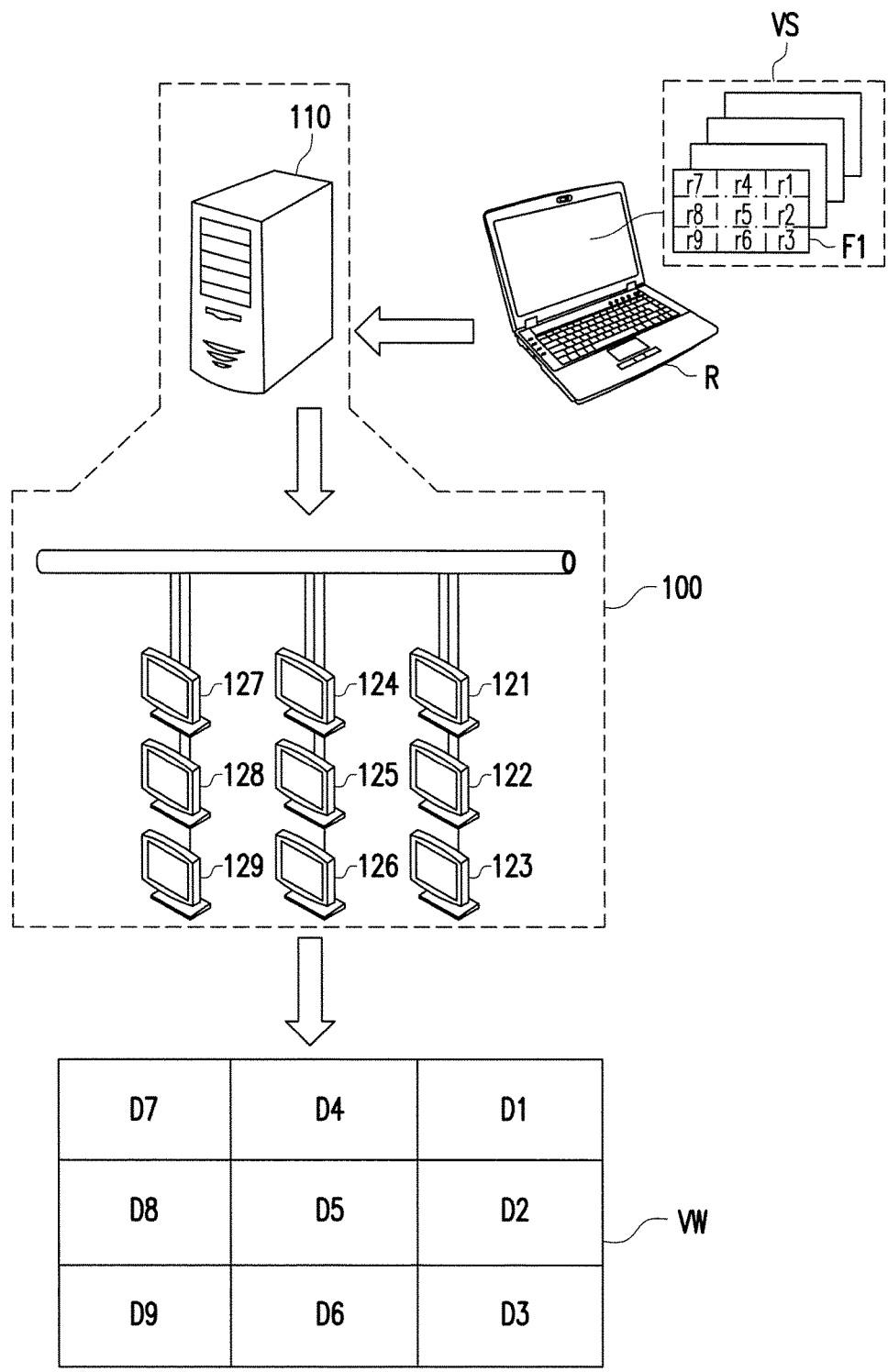
FIG. 1 illustrates a block diagram of a display system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a display system in accordance with one of the exemplary embodiments of the disclosure. It should be noted that this is merely for illustrative purposes, and yet the disclosure is not limited in this regard. All components of the display system and their configurations are first introduced in FIG. 1. The functionalities of the components are disclosed in more detail in conjunction with FIG. 2.

Referring to FIG. 1, a display system 100 in the present exemplary embodiment may include a server and any number of player devices. One server 110 and nine player devices 121-129 would be illustrated hereafter.

The server 110 may be a computer system with computing and communication features such as a cloud server, a database server, an application server, a workstation, and so forth. It should be understood by the person skilled in the art that the server 110 may at least include a processor, a memory, and a communication module.

The structures of the player devices 121-129 are the same, and each of which is configured to display received video streams respectively on displays D1-D9 that form a video wall VW. The player devices 121-129 may respectively be stand-alone computer systems, devices connected to displays D1-D9, or devices installed internally in the displays D1-D9 such as system on chip (SoC) players. The player devices 121-129 may respectively include decoders, communication modules, and controllers configured to control the displays D1-D9. In the present exemplary embodiment, the player devices 121-129 may be inter-connected and respectively connected to the server 110 through a local network. The player devices 121-129 may include a master player device (e.g. the player device 121) that records position information and angle information of the displays D1-D9 respectively corresponding to the player devices 121-129 such as positions, angles, and orientations that may be expressed as coordinates. Such position information and angle information will be referred to as "a position record" hereafter.

In the present exemplary embodiment, a video stream may be provided by a third-party remote device R which may be connected to the server 110 through the Internet. In another exemplary embodiment, a video stream may be prestored in the server 110 or transmitted to the server 110 from a local device through a local network or a wired connection. The disclosure is not limited in this regard.

The remote device R in the present exemplary embodiment may be a computer system including a graphical processing unit (GPU), central processing unit (CPU), a memory, and a communication module. The server 110 may receive and transmit the position record related to the displays D1-D9 from the master player device 121 to the remote device R. The remote device R may render a video stream VS including frames, segment each of the frames of the video stream VS into nine regions r1-r9 according to the information such as positions, angles, orientations of the displays D1-D9 recorded in the position record, encode each of the frames of the video stream VS for video compression and network bandwidth saving, and transmit the encoded video stream VS to the server 110. Hence, the video wall VW in the exemplary embodiment may be connected to the remote device R and the server 110 through the network and may thus not be restricted by the length of any conventional signal transmission line. Also, the memory of the remoted device R may be sufficient to render complicated and high-resolution frames so as to enhance the application flexibility.

Figure 2:
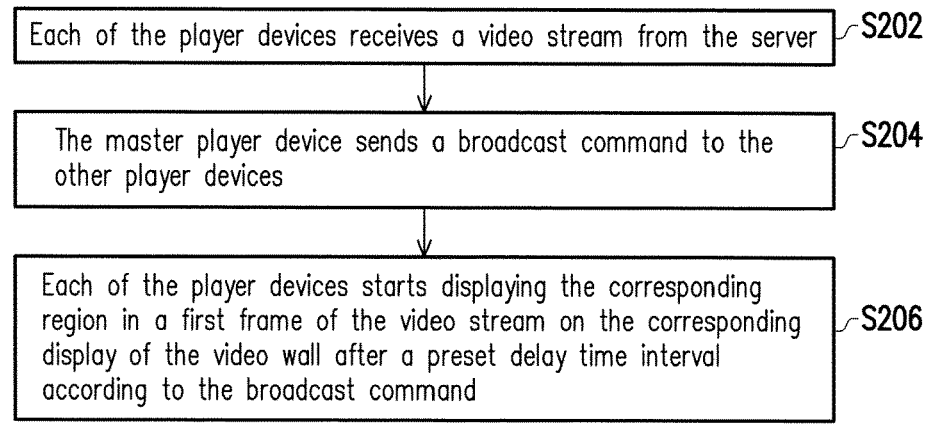
FIG. 2 illustrates a flowchart of a display method in accordance with one of the exemplary embodiments of the disclosure.

After the server 110 receives the video stream VS, it may start performing steps of a display method as illustrated in a flowchart in FIG. 2 according to an exemplary embodiment of the disclosure.

Referring to both FIG. 1 and FIG. 2, each of the player devices 121-129 may receive the video stream VS from the server 110 (Step S202). Herein, the server 110 may transmit the video stream VS to the player devices 121-129 respectively. Moreover, since the player devices 121-129 are connected to each other, they may also share the received parts of the video stream VS to each other on a peer-to-peer (P2P) file sharing basis to save transmission time.

One of the most important tasks of the display technique used in the video wall VW is to create a synchronization time. If playing times of the player devices 121-129 are not synchronized, frames displayed on the video wall VW may be incoherent and disordered. Hence, the master player device 121 may send a broadcast command to the other player devices 122-129 (Step S204), and each of the player devices 121-129 may start displaying the corresponding region r1-r9 in a first frame F1 of the video stream VS on the corresponding display D1-D9 of the video wall VW after a preset delay time interval according to the broadcast command (Step S206).

In detail, since the master player device 121 sends out the broadcast command in the local network, all the player devices 121-129 may receive the broadcast command in really close time proximity. For example, Table 1 illustrates timestamps of the broadcast command received by the player device 122 and player device 123 in the local network, where a system time difference is 195 ms between the two player devices 122 and 123. The test result shows that a relative time difference of receiving the broadcast command is 5 ms-6 ms between the two player devices 122 and 123. That is, the relative time difference is less than a playing time of a single frame 20 ms or 30 ms, which is unperceivable by the human eye.

TABLE 1

| timestamp of player device 122 | timestamp of player device 123 | time difference between timestamps (ms) | relative time difference (ms) |
|---|---|---|---|
| 680 | 480 | 200 | 5 |
| 200 | 10 | 190 | −5 |
| 739 | 550 | 189 | −6 |
| 270 | 80 | 190 | −5 |
| 800 | 600 | 200 | 5 |
| 319 | 130 | 189 | −6 |
| 850 | 650 | 200 | 5 |
| 360 | 170 | 190 | −5 |
| 890 | 690 | 200 | 5 |
| 680 | 480 | 200 | 5 |

After the master player device 121 itself and the other player devices 122-129 receive the broadcast command, they may set the time to start playing the video stream VS according to the same preset delay time interval (e.g. 2s). For example, assume that the player device 122 receives the broadcast command when the system time is 12:11:11:223, and therefore it may start displaying the region r2 in the first frame F1 of the video stream VS on the corresponding display D2 when the system time is 12:11:13:223. Assume that the player device 123 receives the broadcast command when the system time is 12:12:10:455, and therefore it may start displaying the region r3 in the first frame F1 of the video stream VS on the corresponding display D3 when the system time is 12:12:12:455.

The decoder of each of the player devices 121-129 may perform input/output (I/O) processing and decode the corresponding region of the video stream VS to restore the frames of the video stream VS back to the original frames without being encoded. In terms of a frame with 1024 samples, its decoding time is normally 23.22 ms. Hence, it is sufficient for each of the player device 121-129 to finish decoding the corresponding region in the first frame F1 within the preset delay time interval and wait until the preset delay time interval ends to play in synchronization to attain smooth and stable switching control. Accordingly, even there exists time differences among system times of the player devices 121-129, it still ensures that each of the player devices 121-129 is able to play the corresponding region r1-r9 in the first frame F1 of the video stream VS on the corresponding display D1-D9 synchronizedly. On the other hand, each of the player devices 121-129 may continuously play the corresponding region r1-r9 in other frames following the first frame F1 of the video stream VS on the corresponding display D1-D9 according to a corresponding system clock signal, where the frequency of the system clock signal of each of the player devices 121-129 is the same. Hence, given that all the regions in the first frame F1 of the video stream VS are played synchronizedly, all the regions in the subsequent frames are able to be played synchronizedly and smoothly for a certain time period.

Figure 3:
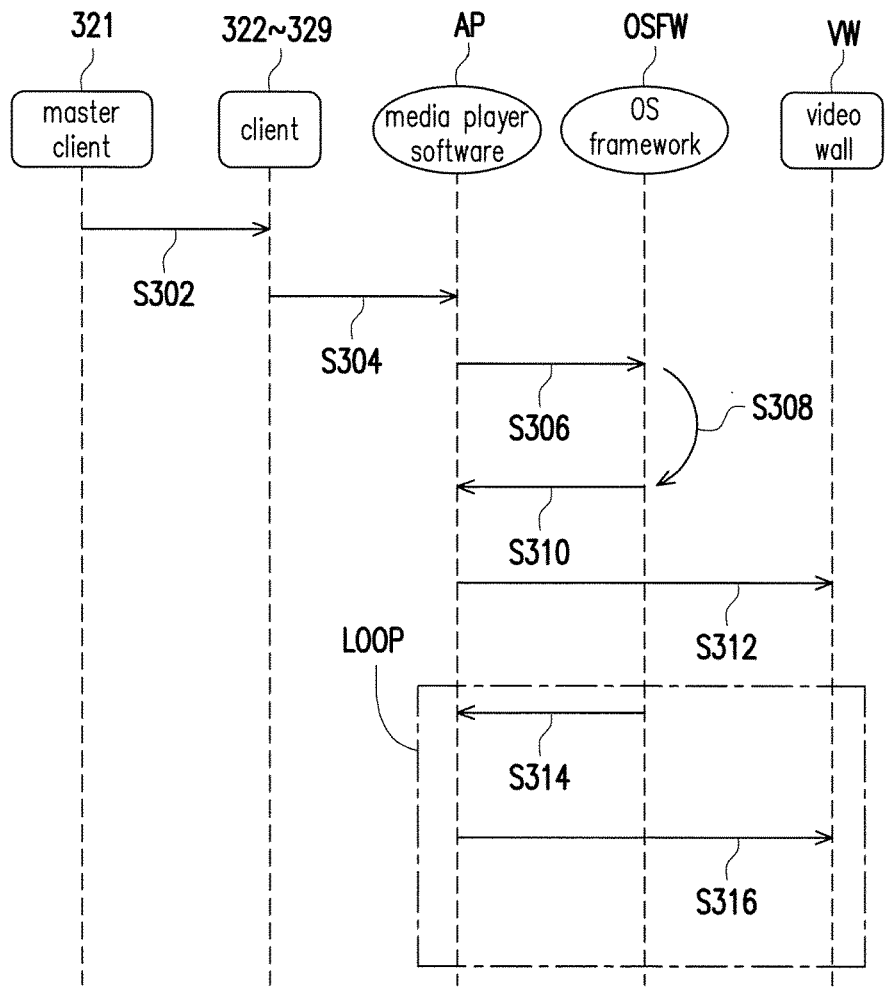
FIG. 3 illustrates a scenario flow diagram of a display method according to another exemplary embodiment of the disclosure.

FIG. 3 illustrates a scenario flow diagram of a display method according to another exemplary embodiment of the disclosure.

Referring to FIG. 3, a master client 321 and clients 322-329 in the present exemplary embodiment are akin to the master player devices 121 and player devices 122-129 in FIG. 1. After the master client 321 and the clients 322-329 receive a video stream, the master client 321 may send a broadcast command to the clients 322-329 (Step S302). Next, each of the clients 321-329 respectively notifies media player software AP in a corresponding application layer to set a playing time of a first frame of the video stream based on a preset delay time interval (Step S304). There exists an interface between the media player software AP and an operating system (OS) layer (e.g. an Andriod OS framework OSFW). The media player software AP may call such interface within the preset delay time interval, decode the video stream, and temporarily store decoded frames in a buffer to wait for the playing time (Step S306). Programming code to implement such interface according to an exemplary embodiment of the disclosure is illustrated as follows.

```
if (m_bVideoRendererWait)
{
    struct timeval tv;
    struct tm *Local_tm;
    gettimeofday(&tv,NULL);
    Local_tm = localtime(&tv.tv_sec);
    int now_hr = Local_tm->tm_hour;
    int now_min = Local_tm->tm_min;
    int now_sec = Local_tm->tm_sec;
    int now_ms = tv.tv_usec/1000;
    int diff_ms = (m_hr*3600*1000
m_min*60*1000 m_sec*1000 m_msec) –
(now_hr*3600*1000now_min*60*1000now_sec*1000
now_ms);
    if (diff_ms<0)
    {
        ALOGD("It is to late\n");
    }
    postVideoEvent_1((diff_ms)*1000);
    ALOGD("Wait %d ms to render",diff_ms);
    m_bVideoRendererWait = false;
    m_bSetTimeBack = true;
    return;
}
```

When the OS framework determines that the playing time arrives (Step S308), it may obtain video frame textures of the first frame from the buffer through a playing driver by, for example, calling the function onFrameAvailable( ) as illustrated below, and the media player software AP may obtain the video frame textures of the first frame by for example, calling the function updateTexImage( ) as illustrated below, and the media player software AP may display the first frame on the video wall VW (Step S312) by using OpenGL.

```
public class SurfaceViewRender implements
GLSurfaceView.Renderer,
SurfaceTexture.OnFrameAvailableListener {
    @Override
    public void onFrameAvailable(SurfaceTexture
surfaceTexture) {
        synchronized (mSurfaceLock) {
            canUpdateVideoSurface = true;
        }
    }
    @Override
    public void onDrawFrame(GL10 gl) {
        GLES20.glClearColor(0f, 0f, 0f, 0f);
        GLES20.glClear(GLES20.GL_DEPTH_BUFFER_BIT |
GLES20.GL_COLOR_BUFFER_BIT);
        synchronized (mLayerLock) {
            case VIDEO:
                synchronized(mSurfaceLock) {
                    if (canUpdateVideoSurface) {
                    mSurfaceTexture.updateTexImage( );
                    canUpdateVideoSurface = false;
                    }
                }
                GLES20.glUseProgram(...);
GLES20.glActiveTexture(GLES20.GL_TEXTURE0);
GLES20.glBindTexture(...);
vertices = VertexTransfer.getVertex(...);
DrawVideo(vertices);
break;
case IMAGE:
...
}
```

On the other hand, the clients 321-329 may obtain the other frames sequentially from the buffer according to their own system clock signals (Step S314) and play the other frames through the media player software AP (Step S316), where Step S314 and Step S316 may be performed iteratively (LOOP) until the video stream is done playing.

In summary, in the display method and the display system for a video wall proposed in the disclosure, after each of the player devices receives a video stream, it starts displaying a corresponding region in a first frame of the video stream on the corresponding display of the video wall after a preset delay time interval according to the broadcast command. The disclosure not only provides improved application flexibility, but also ensures synchronization among frames displayed by each of the displays of the video wall even when system times of the player devices are not the same so as to provide better display quality.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display method for a video wall, applicable to a display system having a server and a plurality of player devices, wherein the player devices are connected to the server and the video wall having a plurality of displays, wherein each of the player devices respectively corresponds to a different one of the displays, wherein the player devices comprises a master player device, and wherein the method comprises the following steps:
   recording position information of the displays by the master player device to generate a position record;
   receiving a video stream from the server by each of the player devices, wherein each of the player devices respectively corresponds to a different one of regions in the video stream, and wherein the step of receiving the video stream from the server by each of the player devices comprises:
      receiving the position record from the master player device by the server and transmitting the position record to a remote device by the server;
   sending a broadcast command by the master player device to other player devices; and
   in response to the broadcast command being received by each of the player devices, starting displaying the corresponding region in a first frame of the video stream on the corresponding display of the video wall by each of the player devices after a same preset delay time interval.

2. The method according to claim 1, wherein the method further comprises:
   recording angle information of the displays by the master player device to generate the position record.

3. The method according to claim 1, wherein the step of receiving the video stream from the server by each of the player devices further comprises:
   receiving the video stream from the remote device by the server and transmitting the video stream to each of the player devices by the server, wherein the remote device generates the video stream having the corresponding regions according to the position record.

4. The method according to claim 1, wherein when receiving the video stream from the server by each of the player devices, the method further comprises:
   receiving the video stream by each of the player devices from each other on a peer-to-peer file sharing basis.

5. The method according to claim 1, wherein after the step of sending the broadcast command by the master player device to the other player devices, the method further comprises:
   when receiving the broadcast command by each of the player devices, setting a time to display the corresponding region in the first frame of the video stream according to the same preset delay time interval.

6. The method according to claim 1, wherein the video stream received from the server by each of the player devices is an encoded video stream, and wherein within the same preset delay time interval, the method further comprises:
   decoding the corresponding region in the video stream by each of the player devices.

7. The method according to claim 1, wherein after the step of starting displaying the corresponding region in the first frame of the video stream on the corresponding display of the video wall by each of the player devices after the same preset delay time interval, the method further comprises:
   continuously displaying the corresponding region in other frames of the video stream on the corresponding display of the video wall by each of the player devices according to a system clock signal thereof with a same frequency.

8. A display system for a video wall comprising:
   a server; and
   a plurality of player devices, connected to the server and a video wall having a plurality of displays, wherein each of the player devices respectively corresponds to a different one of the displays, wherein the player devices comprises a master player device, and wherein:
      the master player device records position information of the displays to generate a position record;
      each of the player devices receives a video stream from the server, wherein each of the player devices respectively corresponds to a different one of regions in the video stream, and wherein the server receives the position record from the master player device and transmits the position record to a remote device;
      the master player device sends a broadcast command to the other player devices; and
      in response to the broadcast command being received by each of the player devices, each of the player devices starts displaying the corresponding region in a first frame of the video stream on the corresponding display of the video wall after a same preset delay time interval.

9. The display system according to claim 8, wherein the master player device further records angle information of the displays to generate the position record.

10. The display system according to claim 8, wherein the server further receives the video stream from the remote device, and transmits the video stream to each of the player devices, wherein the remote device generates the video stream having the corresponding regions according to the position record.

11. The display system according to claim 8, wherein each of the player devices further receives the video stream from each other on a peer-to-peer file sharing basis.

12. The display system according to claim 8, wherein when receiving the video stream from the server, each of the player devices further sets a time to display the corresponding region in the first frame of the video stream according to the same preset delay time interval.

13. The display system according to claim 8, wherein the video stream received from the server by each of the player devices is an encoded video stream, and wherein each of the player devices decodes the corresponding region in the video stream within the same preset display time interval.

14. The display system according to claim 8, wherein after starting displaying the corresponding region in the first frame of the video stream on the corresponding display of the video wall after the same preset delay time interval, each of the player devices, according to a system clock signal thereof with a same frequency, continuously displays the corresponding region in other frames of the video stream on the corresponding display of the video wall.

* * * * *